(No Model.)

N. JACOBSEN & H. P. JENSEN.
CENTRIFUGAL CREAMER.

No. 315,628. Patented Apr. 14, 1885.

WITNESSES:
Fred. G. Dieterich

Hans P. Jensen
Niels Jacobsen
INVENTORS,
By Louis Bagger & Co.
ATTORNEYS.

UNITED STATES PATENT OFFICE.

NIELS JACOBSEN AND HANS PETER JENSEN, OF AARHUS, DENMARK.

CENTRIFUGAL CREAMER.

SPECIFICATION forming part of Letters Patent No. 315,628, dated April 14, 1885.

Application filed September 20, 1884. (No model.) Patented in Denmark October 23, 1882, No. 738.

*To all whom it may concern:*

Be it known that we, NIELS JACOBSEN and HANS P. JENSEN, residents of Aarhus, in the Kingdom of Denmark, have invented certain new and useful Improvements in Centrifugal Creamers; and we do hereby declare that the following is a full, clear, and exact description of the invention, which will enable others skilled in the art to which it appertains to make and use the same, reference being had to the accompanying drawings, which form a part of this specification, and in which—

Figure 1:
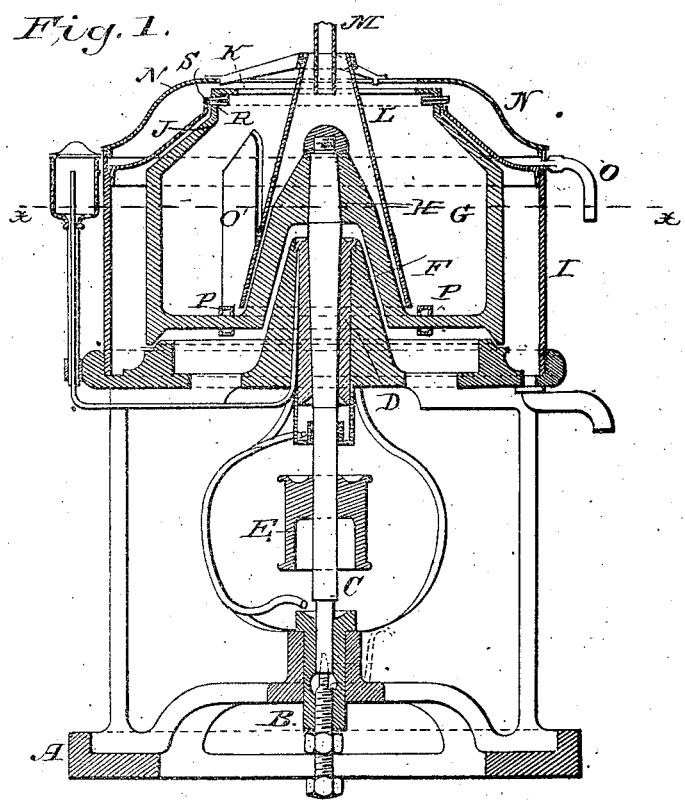
Figure 2:
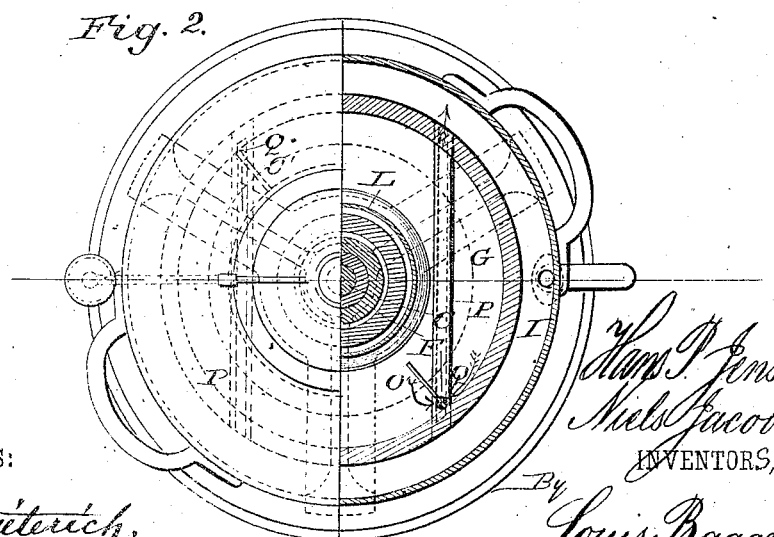

Figure 1 is a vertical sectional view of our improved centrifugal creamer; and Fig. 2 is a top view of the same, showing one-half of it in horizontal section on line $x\ x$, Fig. 1.

Similar letters of reference indicate corresponding parts in both the figures.

Our invention has relation to that class of centrifugal creamers in which the receptacle has a conical bottom, and in which the skimmed milk is drawn off through apertures near the outer edge of the bottom, while the cream is drawn off through apertures near the center of the upper end of the receptacle, and in which the milk is introduced into the receptacle through an inverted funnel placed over the conical bottom; and it consists in the improved construction and combination of parts of such a creamer, as hereinafter more fully described and claimed.

In the accompanying drawings, the letter A indicates the stand, which is provided with a step, B, at its lower end for the reception of the main shaft C, and has a conical bearing, D, at its upper end, in which bearing the upper end of the shaft turns. The middle of the shaft is provided with a pulley, E, over which the belt from the motor passes, and the conical central portion, F, of the milk-receptacle G is secured upon the upper end of the shaft, the shaft projecting up into a conical recess, H, in the said conical portion, the recess fitting over the conical bearing of the shaft.

The milk-receptacle is surmounted by a sheet-metal jacket, I, and the upper portions of the sides of the receptacle are inclined toward the center, forming a truncate conical upper portion or flange, J, the upper edge of which is bent horizontally inward to form an annular flange, K, and an inverted sheet-metal funnel, L, projects with its upper contracted end through the aperture in the top of the receptacle, which is surrounded by the annular flange, and has a pipe, M, through which the milk is conveyed to the contracted end. An annular vessel, N, is placed upon the top of the jacket surrounding the milk-receptacle, and corresponds in form to the conical shape of the upper portion of the milk-receptacle and is provided with a spout, O, through which the cream which is collected in this vessel may be drawn off.

The milk-receptacle has a number of flanges or wings, O', preferably two, placed diametrically opposite to each other, and extending from the sides toward the center of the receptacle, and the closed ends of two covered channels, P P, have diametrically-opposite perforations, Q Q, at the lower ends of these flanges, and extend parallel to each other, forming secants to the bottom of the receptacle, and open at their other ends in the edge of the said bottom. The upper flanges of the conical upper portions of the receptacle have a number of perforations, R, provided with horizontal tubes S, which open into the annular vessel surrounding the upper end of the receptacle, and it will now be seen that, as the milk is fed into the receptacle through the feed-pipe and the conical feed-funnel the milk will be forced by the centrifugal force to separate, the flanges or wings forcing the milk to revolve with the receptacle, and the heavier skimmed milk will be forced toward the outer sides of the receptacle, where it will pass out through the perforations opening into the channels in the bottom of the receptacle into the said channels, from which it will be discharged into the bottom of the jacket surrounding the receptacle, which jacket is provided with a discharge-spout, while the lighter cream will be collected in the center of the receptacle and flow out through the horizontal pipes S at the upper end of the receptacle into the annular cream-receptacle surrounding the upper end of the milk-receptacle, from whence it will flow out through the discharge-spout. It will be seen that in this manner there may be a continuous flow of milk into the milk-receptacle, and consequently there will be a continuous flow of separated milk and cream out of the two receptacles as long as the revolutions of the milk-receptacle are kept up and the milk is admitted into the receptacle.

We are aware that centrifugal creamers have been made with a conical bottom surrounding a conical bearing for the central shaft, and we are aware that likewise it is not broadly new to draw off the skimmed milk through apertures near the edge of the bottom of the receptacle or to feed the milk into the receptacle through an inverted funnel placed over the conical bottom, and we do not claim such constructions, broadly; but

We claim—

In a centrifugal creamer, the combination of the stand having a central conical and vertical bearing, the drive-shaft journaled in the said bearing, the milk-receptacle provided with a central conical portion having a conical recess in its under side and secured upon the upper end of the shaft, the vertical diametrically-opposite flanges or wings, the channels having perforations opening at the foot of the flanges in the bottom of the receptacle passing as secants across the bottom of the receptacle and opening at the edge of the same, the cream-tubes opening horizontally at the upper end of the receptacle, the conical feed-funnel fitting over the conical portion of the receptacle, the feed-tube, the jacket surrounding the receptacle and having an outlet-spout, and the annular cream-receptacle surrounding the upper portion of the milk-receptacle having an outlet-spout and having the cream-tubes opening into it, as and for the purpose shown and set forth.

In testimony that we claim the foregoing as our own we have hereunto affixed our signatures in presence of two witnesses.

NIELS JACOBSEN.
HANS PETER JENSEN.

Witnesses:
F. HASSDRIUS,
C. SCHAARUP.